July 21, 1959 H. E. TOMPKINS 2,896,130

TRANSISTOR ACTUATED DEVICE

Filed Sept. 16, 1955

*INVENTOR.*
HOWARD E. TOMPKINS

*BY* Laurence R. Brown

ATTORNEY

United States Patent Office 2,896,130

Patented July 21, 1959

2,896,130

TRANSISTOR ACTUATED DEVICE

Howard E. Tompkins, Ridley Park, Pa., assignor to Burroughs Corporation, Detroit, Mich., a corporation of Michigan Application September 16, 1955, Serial No. 534,809

2 Claims. (Cl. 317—148.5)

This invention relates generally to means for actuating relays and in particular to a device for reading numbers electrically into mechanical printing devices such as used in mechanical business machines. Thus, the invention is concerned with an improved means for stopping a print bar of a keyboard printing machine at a position representative of the number to be printed.

In an exemplary system in which this invention is embodied, a high speed electronic computer may be utilized to produce electrical signals for telling a printer when each number is coming up. The printer then senses or mechanically scans each digit position to see which digit corresponds with the stated electrical signals. The print bar is moved to position for printing a particular digit where it is stopped or selected at the right time during the sensing cycle with a solenoid actuated pawl. Accurate timing and fast operation of the pawl is necessary to assure proper digit selection. Formerly known circuit techniques for performing this operation required high current thyratron tubes, which are difficult to deionize and which are limited in speed of operation because of ionizing techniques. Also a high power filament source is required and the physical size is large.

An object of this invention is to provide an improved high speed solenoid operated device for setting a selected digit or character in a keyboard printer.

Another object is to provide solenoid actuation and release means wherein high speed functioning of position locating pawls is now made possible without control circuits including high power electronic tubes.

Another object is to provide solenoid actuation and release means wherein high speed functioning of pawls is possible with a circuitry dissipating little power and taking little space so that physical mounting in a compact business machine is possible.

A still further object of this invention is to provide an improved pulse operated transistor circuit adapted to operate a solenoid.

In describing this invention in detail, reference will be made to the attached drawings wherein.

Figure 1:
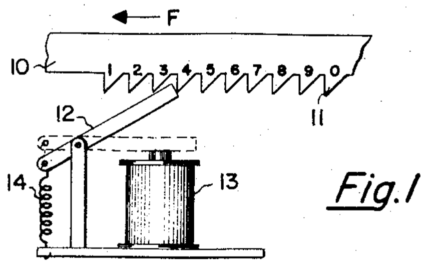
Fig. 1 illustrates fragmentary details of a rack stop solenoid to be actuated in accordance with this invention.

As shown in Fig. 1 a control rack 10 is provided with a stop or indent 11 for each digital position in which the rack 10 is to be held against a force F tending to move it to the left as shown. The rack 10 is mechanically linked to a printing mechanism to set up corresponding type characters in the respective digit positions, and is moved through a scanning cycle during a period of the printing operation. The solenoid and pawl assembly has an armature pawl or clapper 12 positioned to abut against one of the stops 11 when the relay solenoid 12 is deenergized, thereby indicating the particular digit to be selected. The clapper 12 is pivotally mounted in operative relation to the solenoid 13, and is biased by a spring 14 towards its rack-engaging position. In its initial position the solenoid 13 is energized, and the pawl or clapper 12 is retracted to be clear of the stops 11. This energized position is the normal position of the clapper 12. To stop the rack at the selected position, the solenoid 13 is deenergized at the proper instant so that the spring 14 kicks the clapper 12 into engagement with the particular stop 11, which designates the selected digit. Thus, faster operation is possible than with a selection of the stop 11 in response to energization of the relay.

Figure 2:
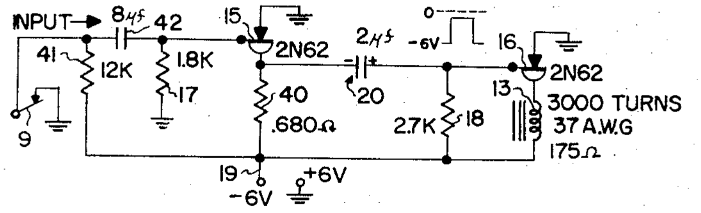
Fig. 2 illustrates transistor circuitry embodying one aspect of the invention for coupling to actuate a rack pawl stop.

Referring to Fig. 2, a transistor circuit provided in accordance with the invention is shown schematically. The circuit description will proceed with the circuit in the condition existing prior to the receipt of a signal. The circuit includes an input p-n-p junction transistor 15 and an output p-n-p junction transistor 16, this latter for controlling the energizing and de-energizing of the solenoid 13. The transistor 15 is actuated by the receipt of a negative trigger signal pulse caused by opening switch 9, but is initially in the absence of a signal essentially cut off. Thus, its base resistance 17 is grounded, connected to a point at ground or reference potential, and chosen of low enough value to keep this input base at nearly ground potential or near cutoff. However, the resistance 17 must be high enough so that when the signal current is received the potential of its base will be lowered far enough below ground potential; i.e., (−0.5 volt), to drive the input transistor 15 into high conduction or saturation. On the other hand, the base resistance 18, of the output transistor 16 is chosen in conjunction with the supply voltage at lead 19, so as to provide the proper base current required to keep the output transistor 16 initially in a high conduction state or saturation.

When a signal is received such as by opening the switch 9, the peak signal current causes a lowering of the base voltage of transistor 15 below the emitter voltage of transistor 15, thus causing the input transistor 15 to conduct. Part of the increasing input stage collector current drives through capacitance 20 into the "on" transistor base resistor 18 causing the output transistor 16 cutoff, which reduces the output collector current substantially to zero and releases the clapper of solenoid 13.

The capacitance 20 and the base resistance 18, especially the latter, are tied in closely with the output transistor and solenoid design. It is desirable to keep the output transistor 16 conducting in the absence of signal so that its collector voltage will be low (−0.5 volt) and thus collector dissipation will be low. If the time during switching is reasonably brief, the transistor 16 can safely switch loads many times higher than its own maximum dissipation rating. However, in the example given, with a switching time not less than 1.25 milliseconds to assure release of the solenoid and not more than about 5 milliseconds, the transistor 16 is never substantially over its dissipation rating. The capacitor 20 must be large enough so that the time constant of it and the combination of the resistance 18 and the base input resistance of the "on" output transistor 16 in parallel will be not less than 1.25 milliseconds which is the minimum electromagnetic release time of the solenoid 13 (the total release time is about 5 milliseconds). In this case, one microfarad is the minimum, and the two microfarad value provides a safety margin.

The correct value of capacitor 20 is arrived at as follows: Collector current is first determined from the number of turns on the solenoid and the number of ampere turns required. The solenoid D.C. resistance must be such that the voltage drop across it will be about 0.5 volt less than the supply voltage to account for the saturation collector drop. The value of base current required is, to a good approximation, the collector current divided by the current gain of the transistor. Then, the supply voltage less the base drop (0.7 volt) divided by the desired base current is the value of the resistance 18.

The collector resistor 40 of transistor 15 is of interest in connection with operation above customary room temperature (25° C.). As the temperature rises, the value of cutoff current increases. If the resistance 40 is high, the increase in off current increases the drop across resistance 40 and results in decreasing the signal voltage for turning the transistor on. Thus, the required change in collector signal from the off to on conditions also becomes less. Hence, if the resistance 40 is lowered, the voltage drop for the same current will be less, thus maintaining a greater change of collector signal from the off to on state, since the collector voltage is not an appreciable function of temperature in the on state. However, lowering of the resistance 40 shunts current away from the output transistor base and thereby serves to reduce the interstage current gain. The resistance 40 then should be chosen as low as possible to give enough output signal to provide operation at a higher ambient temperature. With a resistance of 680 ohms the upper operating limit is in the range of 70° C.

In general, therefore, the operation of the circuit of Fig. 2 is initiated by either a mechanical opening of switch 9 or an equivalent electrical signal at the input resistor 41. In one successful mode of operation the switch 9 is opened by a mechanical cam for about 85 milliseconds in an operation cycle occurring at a frequency of 112 cycles per minute. This connects the input plate of capacitor 42 to the −6 volts supply, and since the output plate of the capacitor 42 is at about −0.5 volt because of base current through resistor 17 in the cutoff transistor operation, the result is a negative pulse at the base of transistor 15 which serves to make the base more negative than the emitter and therefore initiates high conduction to turn the transistor on. Thus, the increasing collector current causes a signal through capacitor 20 which increases the base potential of transistor 16 and reduces the output collector current to release the clapper of solenoid 13.

Thus, a circuit is provided for successfully operating a rack-stop solenoid with low power. The circuit is operable from a single source of D.C. potential and is capable of attaining small physical dimensions so that it may be readily mounted directly in a business machine or other printing device. More reliable operation is obtainable than with conventional thyratron circuits with a considerable attendant saving in power.

Figure 3:
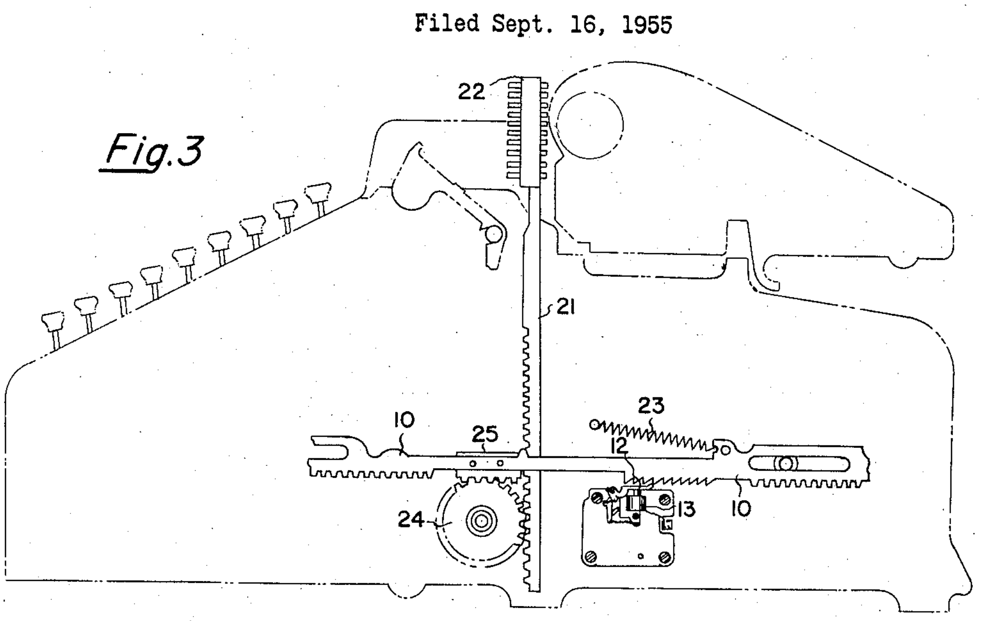
Fig. 3 illustrates fragmentary details of a keyboard-printer assembly showing the actuating mechanism for a printing rack as associated with a relay stop control.

For causing the required linear reciprocation of the rack bar 10 one form of mechanism is shown illustratively in Fig. 3 as a part of a keyboard printer unit wherein vertical motion of the printer rack member 21 may be positioned so that the proper selection of a digit or type character in the type assembly 22 is made. As shown, the rack bar 10 is arranged to be shifted to the right, as seen in Fig. 3 by a camming action common to such units, and is shifted to the left by a spring 23 when the camming action is released. It is on this return motion that a digit is selected to be set on the type-rack 22. The vertical type rack member 21 is operated through the medium of a pinion gear 24, which is rotated by the mating rack gear 25 carried by the rack bar 10. During the return motion of the rack bar 10 by the spring 23, the rack bar teeth 11 are made to scan across the position of the clapper 12 and its solenoid 13. Thus, by properly timed electrical signals to the solenoid 13 of a latching relay permitting release of the normally closed clapper 12, the bar 10 can be stopped to select and set the chosen digit on the printing assembly. Following such as digit setting the solenoid 13 is unlatched either mechanically or electrically and re-energized to hold the clapper 12 closed for the next cycling of the bar 10.

Figure 4:
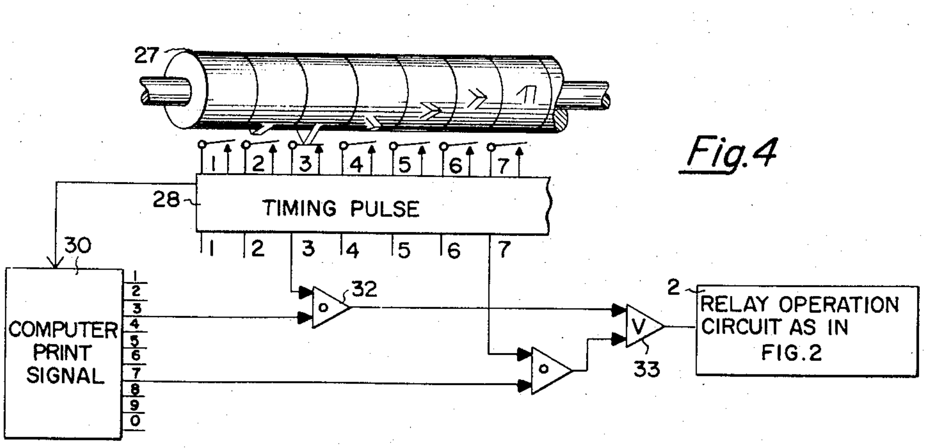
Fig. 4 is a block diagram of a pulse control circuit which may operate in association with an electronic computer for synchronous operation of the rack solenoid control circuit.

As illustrative of one form of electrical signal timing control for the rack bar 10, Fig. 4 shows a timing pulse control circuit, wherein a cam selector 27 operable in synchronism with the rack bar motion of the printer unit is operatively located with respect to switches 31 of a timing pulse unit 28 so that coordinate operation with a computer print signal from circuit 30 is possible. As shown, digit "3" has been selected by the cam assembly 27 to close the selected switch from the series of switches 31 to initiate timing pulse "3" in "and" gate 32, which also includes signal "3" from the computer so that the two signals combine in the mixer control 33 to operate the transistor circuitry 2 for solenoid release. Similar timing may be obtained for any other digit as illustrated for the digit 7.

It is evident from the foregoing specification that an improved high speed electronic system is provided which operates reliably with little power. Accordingly, the novel features of the invention are defined with particularity in the appended claims.

What is claimed is:

1. A pulse operated transistor circuit for operating a solenoid comprising in combination; a first junction transistor having an emitter, a base, and a collector, a resistor connected at one end to the collector of the first transistor and connectible at its other end to a source of collector potential, a first base resistor connected between the base of the first transistor and a point at reference potential, the emitter of the first transistor being directly connected to a point at reference potential, whereby said first transistor is normally cut off, a second junction transistor substantially of the same type as said first transistor and having a base, an emitter, and a collector, a solenoid, said solenoid being connected at one end to the collector of the second transistor and connectible at its other end to the source of collector potential, a second base resistor connected at one end to the base of the second transistor and connectible at its other end to the source of collector potential, the emitter of the second transistor being directly connected to a point at reference potential, whereby said second transistor is normally saturated, a coupling capacitor connecting the collector of the first transistor to the base of the second transistor, circuit means for applying pulses to the base of the first transistor, said first transistor becoming saturated when pulses of the proper amplitude and width are applied to its base, said circuit being so constructed and arranged that the second transistor cuts off and de-energizes said solenoid when the first transistor becomes saturated.

2. In combination; a first and a second junction transistor, each of said transistors being of substantially the same type and having an emitter, a base, and a collector, a first resistor connected at one end to the collector of the first transistor and connectible at its other end to a source of collector potential, a first base resistor connected between the base of the first transistor and a point at reference potential, circuit means directly connecting the emitter of the first transistor to said point at reference potential, whereby said first transistor is normally cut off, a solenoid, said solenoid being connected at one end to the collector of the second transistor and connectible at its other end to said source of potential, a second base resistor connected at one end to the base of the second transistor and connectible at its other end to said source of collector potential, and circuit means directly connecting the emitter of the second transistor to said point at reference potential, whereby said second transistor is normally saturated, a coupling capacitor connecting the collector of the first transistor to the base of the second transistor, the time constant of the circuit comprising the coupling capacitor, the second resistor, and the base resistance of the second transistor being not less than the minimum release time of said solenoid, means for applying pulses to the base of the first transistor, each of said pulses being adapted to cause the first transistor to become saturated, said circuit means being so constructed and arranged that the second transistor cuts off and deenergizes the solenoid when the first transistor becomes saturated.

References Cited in the file of this patent

UNITED STATES PATENTS

| | | |
|---|---|---|
| 2,297,803 | Scheerer | Oct. 6, 1942 |
| 2,584,990 | Dimond | Feb. 12, 1952 |
| 2,644,897 | Lo | July 7, 1953 |
| 2,749,839 | Crowell | June 12, 1956 |
| 2,750,456 | Waldhauer | June 12, 1956 |
| 2,794,856 | Turner | June 5, 1957 |
| 2,802,938 | Herzog | Aug. 13, 1957 |

OTHER REFERENCES

Garner: "A Universal Counter," Radio & Television News, pages 54–55, February 1955.